United States Patent [19]

Döring

[11] 4,312,010

[45] Jan. 19, 1982

[54] INK JET PRINTER

[75] Inventor: Michael Döring, Hamburg, Fed. Rep. of Germany

[73] Assignee: U.S. Philips Corporation, New York, N.Y.

[21] Appl. No.: 165,175

[22] Filed: Jul. 2, 1980

[30] Foreign Application Priority Data

Jul. 7, 1979 [DE] Fed. Rep. of Germany ....... 2927488

[51] Int. Cl.[3] ....... G01D 15/18

[52] U.S. Cl. ....... 346/140 R

[58] Field of Search ....... 346/75, 140 PD

[56] References Cited

U.S. PATENT DOCUMENTS

| | | | |
|---|---|---|---|
| 2,512,743 | 6/1950 | Hansell | 346/140 PD |
| 3,747,120 | 7/1973 | Stemme | 346/75 |
| 3,787,884 | 1/1974 | Demer | 346/75 |
| 3,988,745 | 10/1976 | Sultan | 346/140 PD X |
| 4,229,751 | 10/1980 | Tamai | 346/140 PD |

FOREIGN PATENT DOCUMENTS

| | | | |
|---|---|---|---|
| 2808274 | 6/1979 | Fed. Rep. of Germany | 346/140 PD |

*Primary Examiner*—George H. Miller, Jr.
*Attorney, Agent, or Firm*—Robert S. Smith

[57] ABSTRACT

An ink jet printer comprising conical pressure chambers (2). The pressure chambers have to be filled with ink without inclusion of bubbles. To this end, the pressure chambers (2) are constructed as very flat cones, the ink being supplied to the base thereof via a supply duct (5) which opens into the cone envelope. The ink is discharged from the apex of the cone via a discharge duct. Under the influence of capillary forces, an air bubble is enclosed in the pressure chambers by the ink and is discharged via the apex.

4 Claims, 2 Drawing Figures

INK JET PRINTER

Figure 1:
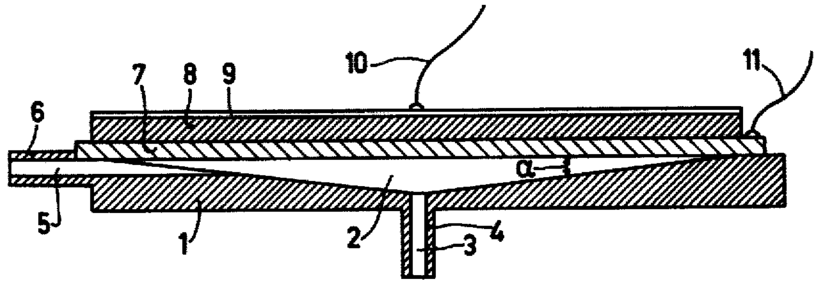

The invention relates to an ink jet printer, comprising at least one conical pressure chamber which comprises a supply duct for ink which opens into the cone envelope and a discharge duct which is arranged in the apex of the cone and which leads to a jet nozzle, the base of said pressure chamber being constructed as a diaphragm and forming a part of a piezoelectric crystal transducer by means of which the ink can be subjected to a changing pressure for the drop-wise ejection of ink via the jet nozzle.

An ink jet printer of this kind is known from U.S. Pat. No. 3,708,798.

The operation of an ink jet printer is trouble-free only if the ink flow to the jet nozzle is not obstructed, for example, by contaminations or air inclusions. Trapped air bubbles notably have a disturbing effect. Therefore, the chamber should always be completely filled with ink, because air bubbles dampen the pressure wave to such an extent that no droplet is ejected; this may give rise to incorrect printing of the character to be recorded on the record carrier.

The geometry of the known ink jet printers, however, is such that air bubbles can be present in the chamber notably when the chamber is filled with ink. Therefore, in such printers the actual printing must be preceeded by a starting phase during which it is attempted to remove any air inclusions from the chamber via the jet nozzle. However, this is not always successful. The deaerating of the chamber could alternatively be stimulated by directing the jet nozzle upwards, so that any air bubbles can escape in view of their tendency to rise. However, because the jet nozzles usually have to be directed to the side, i.e. horizontally, it is difficult to remove such air inclusions from the chamber in this manner. Therefore, prior to the filling with ink, the chamber is often purged with a gas which can subsequently dissolve in the ink. This method is time-consuming, complex and expensive.

The invention has for its object to provide an ink jet printer in which air inclusions are avoided in the ink flow at the area of the pressure chamber and the jet nozzles, while the ink jet head still has a compact construction.

To this end, the ink jet printer in accordance with the invention is characterized in that the pressure chamber is shaped as a cone, the diameter of the base thereof being several times larger than the height, so that the cone envelope encloses a very acute angle with respect to the base, the supply duct opening into the pressure chamber at the area of the connection between the cone envelope and the base.

As a result of these steps, the ink is first circularly guided along the edge of the cone envelope and the base by capillary forces when the pressure chamber is filled. On the side opposite the inlet, these two flows meet, thus enclosing an air bubble which is accurately symmetrically situated within the cone and which communicates with the discharge duct. During the further flowing of ink, the air is slowly forced outwards via the discharge duct and the jet nozzle, the shape of the chamber ensuring a symmetrical air distribution around the apex. The chamber is thus filled without any bubbles. Because the chamber can be filled with printing fluid in any position, the printing head can also be arranged in any position within the ink jet printer. Consequently, the discharge duct and hence also the jet nozzles could also be directed, for example, downwards.

The cone envelope need not necessarily be a cone envelope in a narrow sense. Related shapes such as, for example, a hyperboloid of revolution are also within the scope of the present invention.

This shape of the chamber is particularly suitable for integration in a multiple jet nozzle head. The diaphragm can then be constructed as a plate which is tensioned across all chambers.

The invention will be described in detail hereinafter with reference to the accompanying diagrammatic drawing which shows an embodiment in accordance with the invention.

Figure 2:
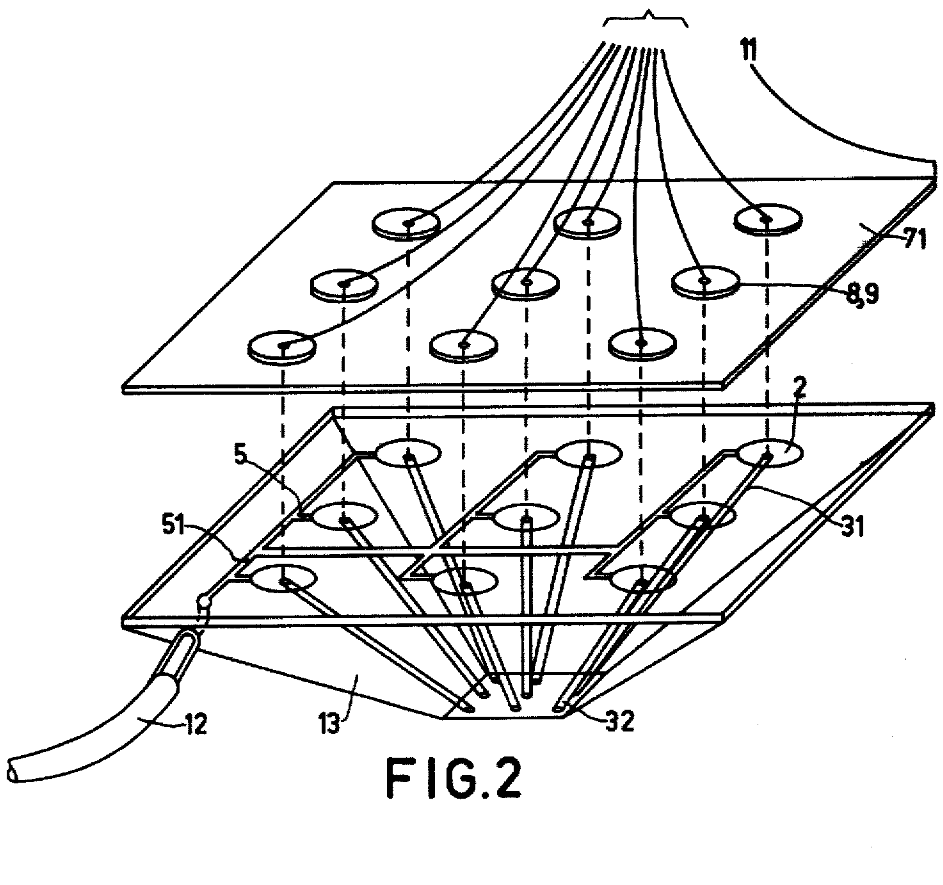

FIG. 1 is a sectional view at an increased scale of a chamber of an ink jet printer in accordance with the invention, and FIG. 2 is a perspective view of a printing head comprising several chambers in accordance with FIG. 1.

The chamber for generating the ejection force for the printing action of an ink jet printer as shown in FIG. 1 consists of a body 1 in which the actual chamber 2 is formed which is filled with printing fluid (ink) via a supply duct 5. The supply of ink can be realized in known manner by means of a tube which is slid over the inlet nozzle 6. The ink is discharged via a discharge duct 3 which is connected to a jet nozzle (not shown in FIG. 1). The discharge nozzle 4, however, can alternatively serve as a combined discharge duct and jet nozzle. The chamber 2 is closed by a metal diaphragm 7 which forms part of a piezoelectric crystal transducer which also comprises the actual piezoelectric crystal 8 and the electrode 9 as well as the electric leads 10 and 11.

The chamber 2 forms a circular cone, the diameter of the base thereof being several times larger (for example, approximately twenty times) than the height. As a result, a very acute angle $\alpha$ is enclosed by the base and the cone envelope. This angle is so small that the edge zone of the chamber exerts a capillary force on the ink. The supply duct 5 also opens into this edge zone (the zone of contact between envelope and base). In order to ensure that the supplied quantity of ink is not too large, the diameter of the supply duct 5 should also be small. Experiments have demonstrated that suitable operation is achieved when the diameter of the base of the circular cone amounts to 5 mm and the height of the cone amounts to 200 $\mu$m. The diameter of the supply duct 5 amounted to approximately half the height of the cone. Other dimensions are also feasible. It is important that on the one hand the supply of ink to the edge zone of the cone is comparatively slow, whilst on the other hand a capillary force is exerted on the ink throughout the edge zone of the chamber 2.

During the filling of the chamber 2, the ink slowly flows through the supply duct 5 and is first guided circularly along the edge of the envelope and the base. These two flows meet and are mixed on the side opposite the supply duct 5. The flows thus enclose an air bubble which is accurately symmetrically situated within the cone and which communicates with the discharge duct 3. When further ink is admitted, the air is slowly forced out via the discharge duct 3, the conical shape of the chamber 2 ensuring a symmetrical distribution of air around the apex of the cone. Finally, the air is completely removed from the chamber 2 and the discharge duct 3. The chamber 2 is thus filled with printing fluid without inclusion of any air bubbles whatsoever.

FIG. 2 shows a printing head of an ink jet printer which comprises a total of nine printing chambers with associated jet nozzles 32. A printing head of this kind can be comparatively easily manufactured when a material in which the circular-conical chambers 2 can be recessed or punched is used for the printing head body 13. The supply duct 5 and the connection ducts 51 thereof can then be simultaneously made by means of milling or punching tools. The connection ducts 51 are connected to the ink supply duct 12. The chambers 2 communicate with the associated jet nozzles 32 via their discharge ducts 31. The printing head body 13 thus manufactured is closed by means of a diaphragm which is constructed as a plate 71. This diaphragm plate 71, being made of metal and serving as one of the electrodes of the piezoelectric crystal transducer, supports the associated piezoelectric crystal 8 with the second electrode 9 on its upper side at the area of each chamber 2. Each piezo-electric crystal transducer is connected to a frequency generator (not shown) via the leads 10. Electric output is realized via the common lead 11.

What is claimed is:

1. An ink jet printer, comprising at least one conical pressure chamber which comprises a supply duct for ink which opens into the cone envelope and a discharge duct which leads to a jet nozzle and which is arranged in the apex of the cone, the base of said pressure chamber being constructed as a diaphragm and forming a part of a piezoelectric crystal transducer by means of which the ink can be subjected to a changing pressure for the drop-wise ejection of ink via the jet nozzle, characterized in that the pressure chamber is shaped as a cone, the diameter of the base thereof being several times larger than the height, so that the cone envelope encloses a very acute angle (α) with respect to the base, the edges of the cone envelope and the base being in immediate contact with each other, the supply duct opening into the pressure chamber at the area of the connection between the cone envelope and the base.

2. An ink jet printer as claimed in claim 1, characterized in that the diameter of the supply duct (5) amounts to approximately half the height of the cone.

3. An ink jet printer as claimed in claim 1 or 2, comprising more than one jet nozzle, characterized in that the diaphragm (7) is constructed as a plate (71) and is common to all pressure chambers (2).

4. An ink jet printer as claimed in any of the claims 1 or 2, characterized in that the pressure chambers (2) and the supply ducts (5) are recessed or punched into the printing head housing (13).

* * * * *